Patented June 4, 1929.

1,716,272

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

COMPOSITION OF MATTER AND METHOD OF MAKING THE SAME.

No Drawing.   Application filed February 3, 1922.  Serial No. 533,986.

My invention relates to a new composition of matter which is particularly designed as a liquid fuel for internal combustion engines, although it may be used for other purposes.

In certain co-pending applications including Serial No. 272,567, filed January 22, 1919, and Serial No. 435,355 filed January 6th, 1921, I have described processes for the partial combustion of aliphatic hydrocarbons in the presence of catalysts by which valuable partial combustion products are obtained. In carrying out the said process, I pass a heated mixture of mineral oil vapor and air in the proper proportions through a catalytic material, such as the blue oxides of molybdenum, while maintaining the reaction zone at a temperature of from about 230° C. to about 500° C., steam being added or not as desired. The temperature will vary with the distillate used and also in accordance with the other factors, such as the air ratio, kind of catalyst used, etc. The material thus treated is then condensed, and the material condensed contains products in the range from alcohols to aldehyde fatty acids, including aldehydes and probably anhydrides and aldehyde alcohols. In my application Serial No. 435,355, above referred to, I also disclose the applying of said partial oxidation process to the "cracked" products of petroleum fractions, especially in the producing of motor spirit or flotation oil. As disclosed in said application, the cracking may be carried out at atmospheric pressures or under higher pressures and temperatures, either in the liquid or vapor phase, and with or without a catalyst.

I have found that the product of said process is or may be formed into a desirable fuel for internal combustion engines and I will now describe my preferred method of treating the same, it being understood that I am not limited to this example in my broader claims.

I distill the condensed product of said process preferably up to about 300°, the residue in the still consisting of the heavier compounds. This residue is a lubricant and may also be treated to form lubricants. It may also be made into soaps and other products of industrial value. The distilled product having an end point of preferably about 300° is then agitated with a volatile fuel such as alcohol or benzol. The volatile or atomizable fuel is preferably of such a nature as to dissolve the distilled portion of the original product, and I preferably add as much of said product as will pass into solution in the said volatile fuel. If alcohol is used for this purpose, two layers will usually be formed. One layer consists of the dissolved product, which may be drawn off, and is then ready for use as a liquid fuel for combustion engines. The other layer, which consists mainly of hydrocarbons, may then be taken and passed through the original partial combustion process to convert it into the partially oxidized product which may then be again treated as above.

In forming this improved fuel I may remove the aldehyde fatty acids present either before or after distillation, as for example by converting them into soaps and removing the soap so formed. This, however, is not a necessary step and may or may not be carried out as desired. If employed it is, of course, used prior to mixing with the volatile fuel.

Instead of using alcohol, such as denatured alcohol, to dissolve my product or a distilled portion thereof, I may employ another solvent such as benzol for this purpose. In this case I agitate the mixture of benzol and said product to make a substantially complete solution.

The following experiments will serve to show the blending ranges possible in dissolving the above oxidized kerosene in various volatile fuels. (The percentages are all by volume.)

(1) Benzol dissolves "oxidized kerosene" in all proportions.

(2) Gasolene dissolves "oxidized kerosene" in all proportions.

(3) A mixture of 50% gasolene and 50% benzol dissolves "oxidized kerosene" in all proportions.

(4) Taking the 50% gasolene and 50% benzol mixture, it was found that the "oxidized kerosene" would make perfect solutions up to two parts of the kerosene to one of the 50:50 mixture, making the composition of the final solution: "oxidized kerosene", 66⅔%, benzol 16⅔%, denatured alcohol 16⅔.

(5) Taking a mixture consisting of two parts of denatured alcohol and one part of benzol, it was found that solution of the "oxidized kerosene" took place perfectly up to three parts, making the composition of the final solution: 50% "oxidized kerosene", 33⅓% denatured alcohol, and 16⅔% benzol.

The advantages of my invention will be obvious to those skilled in the art since in the blended solution the properties of the dissolving medium are blended with those of the dissolved material, so that the valuable characteristics of both are present.

I have found that denatured alcohol will dissolve about 30% of the distillate above referred to, but the proportions may be varied depending upon the solvent used, etc.; the volatile fuel used as a solvent may be varied, for example gasolene may be used for this purpose; the partial combustion product may be distilled or not prior to mixing; the percentages may be varied, and other changes may be made without departing from my invention.

By the term "oxidized paraffin" used in some of the claims, it is intended to include alcohol, benzol, and their equivalents capable of use with the petroleum product referred to herein as "oxidized kerosene", and also as "partial combustion product of hydrocarbons" in motor fuels.

I claim:

1. A composition of matter containing the liquid partial combustion product of hydrocarbons in the range from alcohols to aldehyde fatty acids mixed with another liquid hydrocarbon or hydrocarbon derivative.

2. A composition of matter containing the liquid partial combustion product of hydrocarbons in the range from alcohols to aldehyde fatty acids, dissolved in a volatile liquid hydrocarbon.

3. A composition of matter containing the liquid partial combustion product of hydrocarbons in the range from alcohols to aldehyde fatty acids, dissolved in a volatile liquid hydrocarbon, the volatile hydrocarbon being present to a greater percentage than that of the partial combustion product.

4. A composition of matter containing a distilled fraction of a liquid partial combustion product of hydrocarbons in the range from alcohols to aldehyde fatty acids mixed with another liquid hydrocarbon or hydrocarbon derivative.

5. In the manufacture of mixed liquid hydrocarbon, the steps consisting of distilling a liquid partial combustion product of hydrocarbons in the range from alcohols to aldehyde fatty, acids, and mixing a distilled fraction thereof with another liquid hydrocarbon or hydrocarbon derivative.

6. In the manufacture of mixed liquid hydrocarbon, the steps consisting of fractioning a liquid partial combustion product in the range from alcohols to aldehyde fatty acids, and adding a fraction thereof to another liquid hydrocarbon, the latter being in excess of the said fraction of liquid partial combustion product.

7. A motor fuel containing an oxidized petroleum product and an oxidized paraffin.

8. A fuel mixture comprising a miscible light volatile oxidized petroleum spirit, denatured alcohol and other volatile fuel constituents.

9. A motor fuel comprising denatured alcohol and miscible oxidized kerosene.

10. A motor fuel containing an oxidized product from cracked petroleum and an oxidized paraffin.

11. A liquid fuel comprising alcohol and miscible cracked and oxidized petroleum hydrocarbons.

In testimony whereof I have hereunto set my hand.

JOSEPH HIDY JAMES.